United States Patent
Dar et al.

(10) Patent No.: US 12,242,757 B2
(45) Date of Patent: Mar. 4, 2025

(54) SYSTEM AND METHOD FOR STORAGE OPTIMIZATION USING MACHINE LEARNING- DRIVEN APPLICATION AND WORKLOAD IDENTIFICATION

(71) Applicant: EMC IP Holding Company, LLC, Hopkinton, MA (US)

(72) Inventors: Shaul Dar, Petach Tikva (IL); Ranjith Reddy Basireddy, Telangana (IN); Rajesh Alevoor Kini, Karnataka (IN)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 17/383,627

(22) Filed: Jul. 23, 2021

(65) Prior Publication Data
US 2022/0391137 A1   Dec. 8, 2022

(51) Int. Cl.
*G06F 3/06* (2006.01)
*G06N 20/00* (2019.01)

(52) U.S. Cl.
CPC ............ *G06F 3/0659* (2013.01); *G06F 3/061* (2013.01); *G06F 3/0689* (2013.01); *G06N 20/00* (2019.01); *G06F 2212/7202* (2013.01)

(58) Field of Classification Search
CPC ...... G06F 3/0659; G06F 3/061; G06F 3/0689; G06F 2212/7202; G06N 20/00
See application file for complete search history.

(56) References Cited

U.S. PATENT DOCUMENTS

| | | | |
|---|---|---|---|
| 8,880,836 B2 * | 11/2014 | Owa ................... | G06F 3/0661 |
| | | | 711/170 |
| 10,127,234 B1 * | 11/2018 | Krishnan ............. | G06F 16/119 |
| 2011/0145486 A1 * | 6/2011 | Owa .................. | G06F 12/0246 |
| | | | 711/E12.008 |
| 2014/0359046 A1 * | 12/2014 | Colle ...................... | H04L 9/40 |
| | | | 709/213 |
| 2018/0373722 A1 * | 12/2018 | Ulasen ................. | G06N 3/0445 |
| 2020/0019311 A1 * | 1/2020 | Zolotow ................ | G06F 3/067 |

* cited by examiner

*Primary Examiner* — Kalpit Parikh
(74) *Attorney, Agent, or Firm* — Brian J. Colandreo; Heath M. Sargeant; Holland & Knight LLP

(57) ABSTRACT

A method, computer program product, and computing system for receiving a first set of input/output (IO) requests for one or more storage objects. One or more IO properties may be extracted from the first set of IO requests. Metadata may be associated with the one or more storage objects using one or more machine learning models based upon, at least in part, the one or more IO properties extracted from the first set of IO requests, thus defining storage object metadata. One or more IO processing rules may be enabled based upon, at least in part, the storage object metadata. A subsequent set of IO requests may be received. Processing of the subsequent set of IO requests on the one or more storage objects may be optimized based upon, at least in part, the storage object metadata and the one or more IO processing rules associated with the one or more storage objects.

17 Claims, 6 Drawing Sheets

SYSTEM AND METHOD FOR STORAGE OPTIMIZATION USING MACHINE LEARNING- DRIVEN APPLICATION AND WORKLOAD IDENTIFICATION

RELATED APPLICATION(S)

This application claims the benefit of Indian Provisional Application No. 202111024971, filed on 4 Jun. 2021, the entire contents of which are incorporated herein by reference.

BACKGROUND

Storing and safeguarding electronic content may be beneficial in modern business and elsewhere. Accordingly, various methodologies may be employed to protect and distribute such electronic content.

Storage arrays may be unaware of the applications and workloads that initiate IO requests to volumes or other storage objects stored on the storage array. As a result the ability of the storage array to make important performance decisions and tune relevant parameters is highly restricted. Negative implications can include erroneous data placement, inefficient utilization of system resources, performance problems such as write amplification due to unnecessary data movement across tiers, unnecessary overhead such as compression or dedupe of hot data, missed opportunities for optimization such as prefetching sequentially accessed data to reduce read data latency, and many others.

Determining the application and workload type is challenging for multiple reasons. For example, customers may utilize underlying storage in many different and unforeseen ways. The host operating system generally hides vital storage metadata through layers of abstraction, such as the volume manager and file system. In a block storage device, discrete block IO requests may arrive from multiple hosts and applications, in any order, and the associated IO streams may exhibit very different characteristics. The host and device drivers may communicate with the storage system using protocols such as SCSI and NVMe, giving very little information to the controller with which it can determine the type of application using the storage system. Accordingly, conventional processes for determining the application and/or workload type for a particular volume or other storage object may be ineffective.

SUMMARY OF DISCLOSURE

In one example implementation, a computer-implemented method executed on a computing device may include, but is not limited to, receiving a first set of input/output (IO) requests for one or more storage objects. One or more IO properties may be extracted from the first set of IO requests. Metadata may be associated with the one or more storage objects using one or more machine learning models based upon, at least in part, the one or more IO properties extracted from the first set of IO requests, thus defining storage object metadata. One or more IO processing rules may be enabled based upon, at least in part, the storage object metadata. A subsequent set of IO requests may be received. Processing of the subsequent set of IO requests on the one or more storage objects may be optimized based upon, at least in part, the storage object metadata and the one or more IO processing rules associated with the one or more storage objects.

One or more of the following example features may be included. The one or more storage objects include at least one of: one or more volumes; one or more files; and one or more LUNs. Associating the storage object metadata with the one or more storage objects may include one or more of: associating temporal storage object metadata with the one or more storage objects; and associating spatial storage object metadata with the one or more storage objects. Associating the storage object metadata with the one or more storage objects may include receiving one or more user-defined associations of storage object metadata with the one or more storage objects. Associating the storage object metadata with the one or more storage objects may include providing the one or more user-defined associations of storage object metadata with the one or more storage objects to the one or more machine learning models as training data. Values of one or more of the storage object metadata and the one or more IO processing rules may be dynamically adjusted based upon, at least in part, the processing of the subsequent IO requests on the one or more storage objects. The one or more machine learning models may be configured for one or more of: offline training and continuous training.

In another example implementation, a computer program product resides on a computer readable medium that has a plurality of instructions stored on it. When executed by a processor, the instructions cause the processor to perform operations that may include, but are not limited to, receiving a first set of input/output (IO) requests for one or more storage objects. One or more IO properties may be extracted from the first set of IO requests. Metadata may be associated with the one or more storage objects using one or more machine learning models based upon, at least in part, the one or more IO properties extracted from the first set of IO requests, thus defining storage object metadata. One or more IO processing rules may be enabled based upon, at least in part, the storage object metadata. A subsequent set of IO requests may be received. Processing of the subsequent set of IO requests on the one or more storage objects may be optimized based upon, at least in part, the storage object metadata and the one or more IO processing rules associated with the one or more storage objects.

One or more of the following example features may be included. The one or more storage objects include at least one of: one or more volumes; one or more files; and one or more LUNs. Associating the storage object metadata with the one or more storage objects may include one or more of: associating temporal storage object metadata with the one or more storage objects; and associating spatial storage object metadata with the one or more storage objects. Associating the storage object metadata with the one or more storage objects may include receiving one or more user-defined associations of storage object metadata with the one or more storage objects. Associating the storage object metadata with the one or more storage objects may include providing the one or more user-defined associations of storage object metadata with the one or more storage objects to the one or more machine learning models as training data. Values of one or more of the storage object metadata and the one or more IO processing rules may be dynamically adjusted based upon, at least in part, the processing of the subsequent IO requests on the one or more storage objects. The one or more machine learning models may be configured for one or more of: offline training and continuous training.

In another example implementation, a computing system includes at least one processor and at least one memory architecture coupled with the at least one processor, wherein the at least one processor is configured to receive a first set of input/output (IO) requests for one or more storage objects. The at least one processor may be further configured to extract one or more IO properties from the first set of IO requests. The at least one processor may be further configured to associate metadata with the one or more storage objects using one or more machine learning models based upon, at least in part, the one or more IO properties extracted from the first set of IO requests, thus defining storage object metadata. The at least one processor may be further configured to enable one or more IO processing rules based upon, at least in part, the storage object metadata objects. The at least one processor may be further configured to receive a subsequent set of IO requests. The at least one processor may be further configured to optimize the processing of the subsequent set of IO requests on the one or more storage objects based upon, at least in part, the storage object metadata and the one or more IO processing rules associated with the one or more storage objects.

One or more of the following example features may be included. The one or more storage objects include at least one of: one or more volumes; one or more files; and one or more LUNs. Associating the storage object metadata with the one or more storage objects may include one or more of: associating temporal storage object metadata with the one or more storage objects; and associating spatial storage object metadata with the one or more storage objects. Associating the storage object metadata with the one or more storage objects may include receiving one or more user-defined associations of storage object metadata with the one or more storage objects. Associating the storage object metadata with the one or more storage objects may include providing the one or more user-defined associations of storage object metadata with the one or more storage objects to the one or more machine learning models as training data. Values of one or more of the storage object metadata and the one or more IO processing rules may be dynamically adjusted based upon, at least in part, the processing of the subsequent IO requests on the one or more storage objects. The one or more machine learning models may be configured for one or more of: offline training and continuous training.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
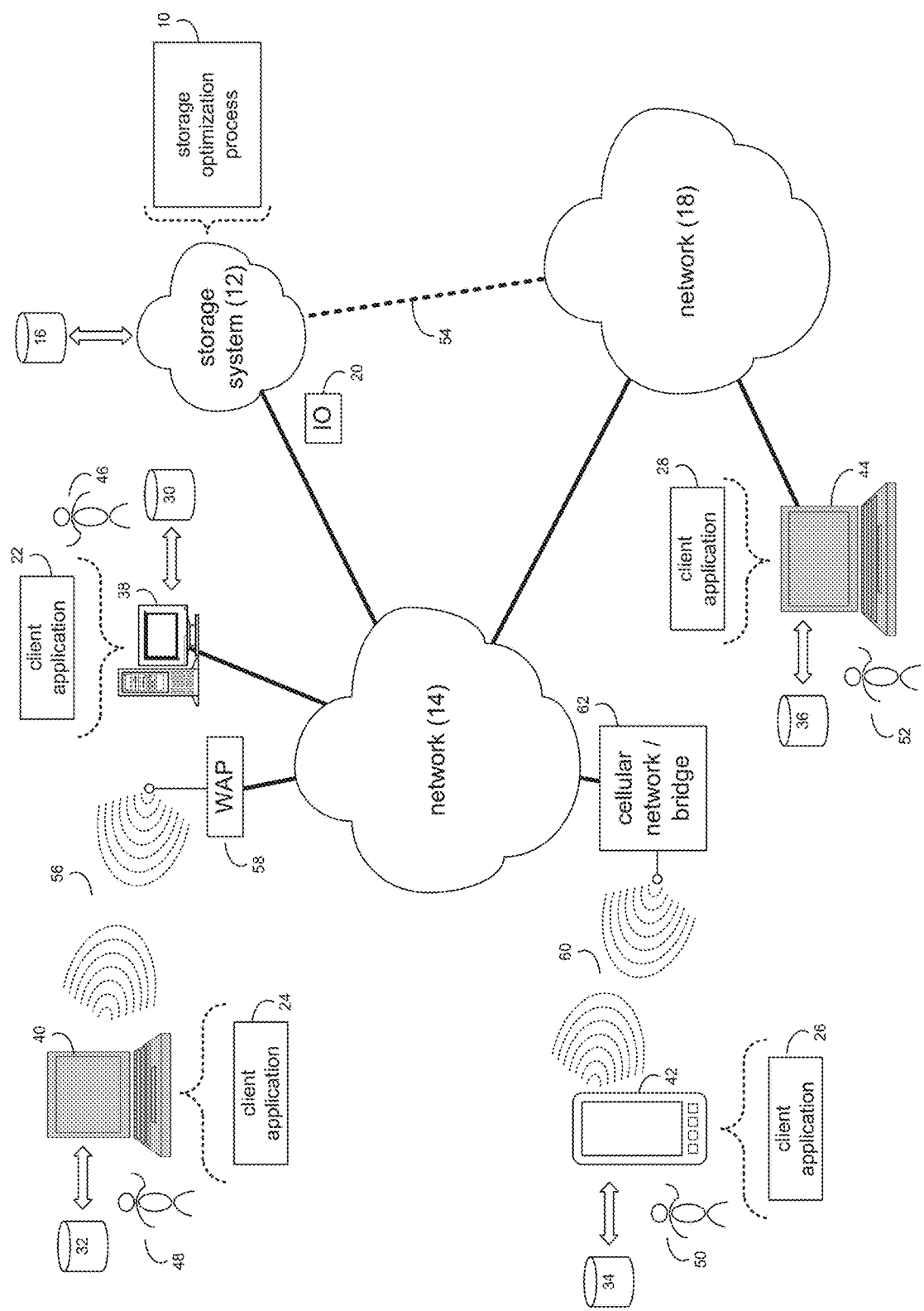
FIG. 1 is an example diagrammatic view of a storage system and a storage optimization process coupled to a distributed computing network according to one or more example implementations of the disclosure.

System Overview:

Referring to FIG. 1, there is shown storage optimization process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of storage optimization process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of storage optimization process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a storage optimization process, such as storage optimization process 10 of FIG. 1, may include but is not limited to, receiving a first set of input/output (IO) requests for one or more storage objects. One or more IO properties may be extracted from the first set of IO requests. Metadata may be associated with the one or more storage objects using one or more machine learning models based upon, at least in part, the one or more IO properties extracted from the first set of IO requests, thus defining storage object metadata. One or more IO processing rules may be enabled based upon, at least in part, the storage object metadata. A subsequent set of IO requests may be received. Processing of the subsequent set of IO requests on the one or more storage objects may be optimized based upon, at least in part, the storage object metadata and the one or more IO processing rules associated with the one or more storage objects.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
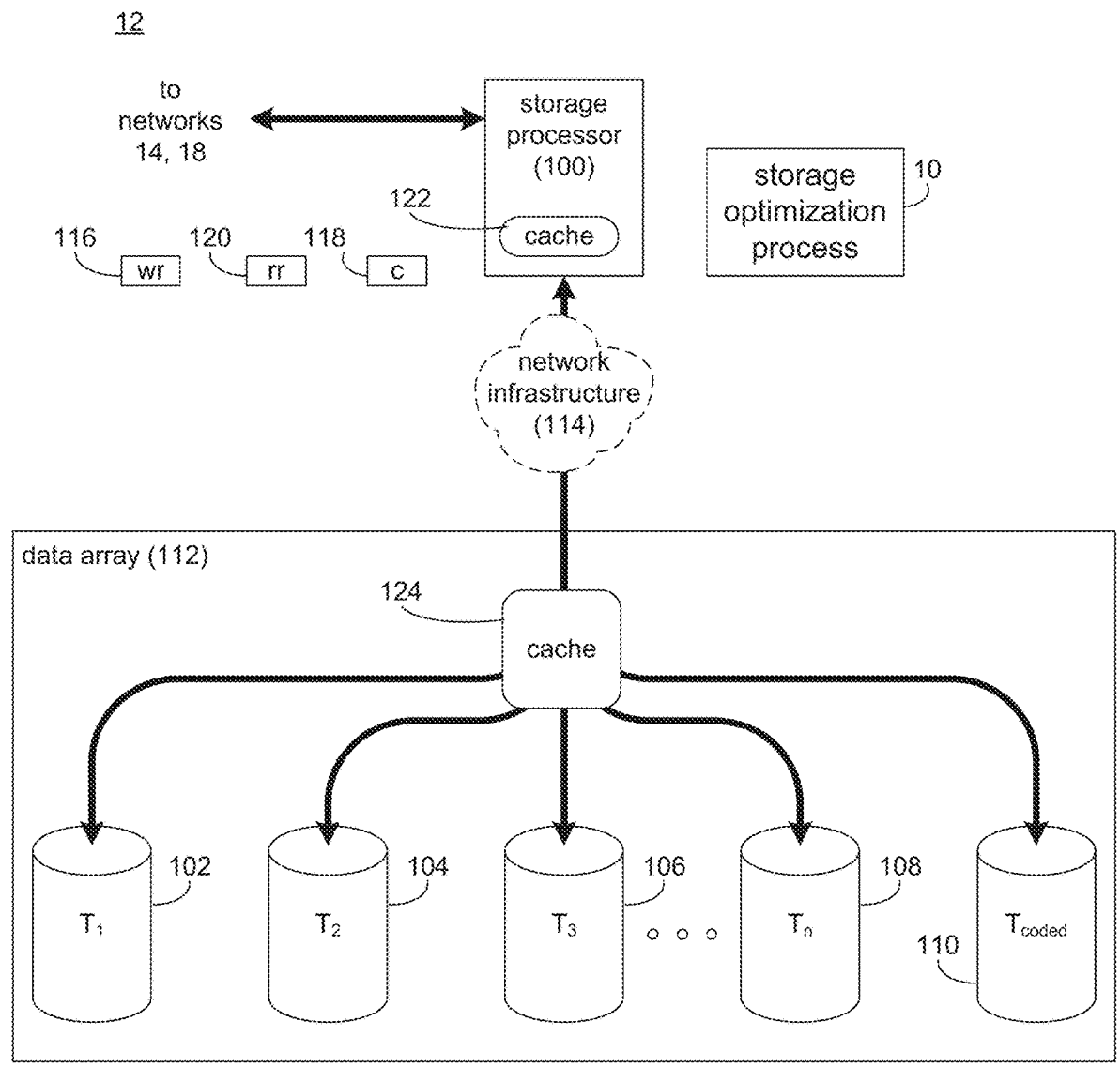
FIG. 2 is an example diagrammatic view of the storage system of FIG. 1 according to one or more example implementations of the disclosure.
Figure 3:
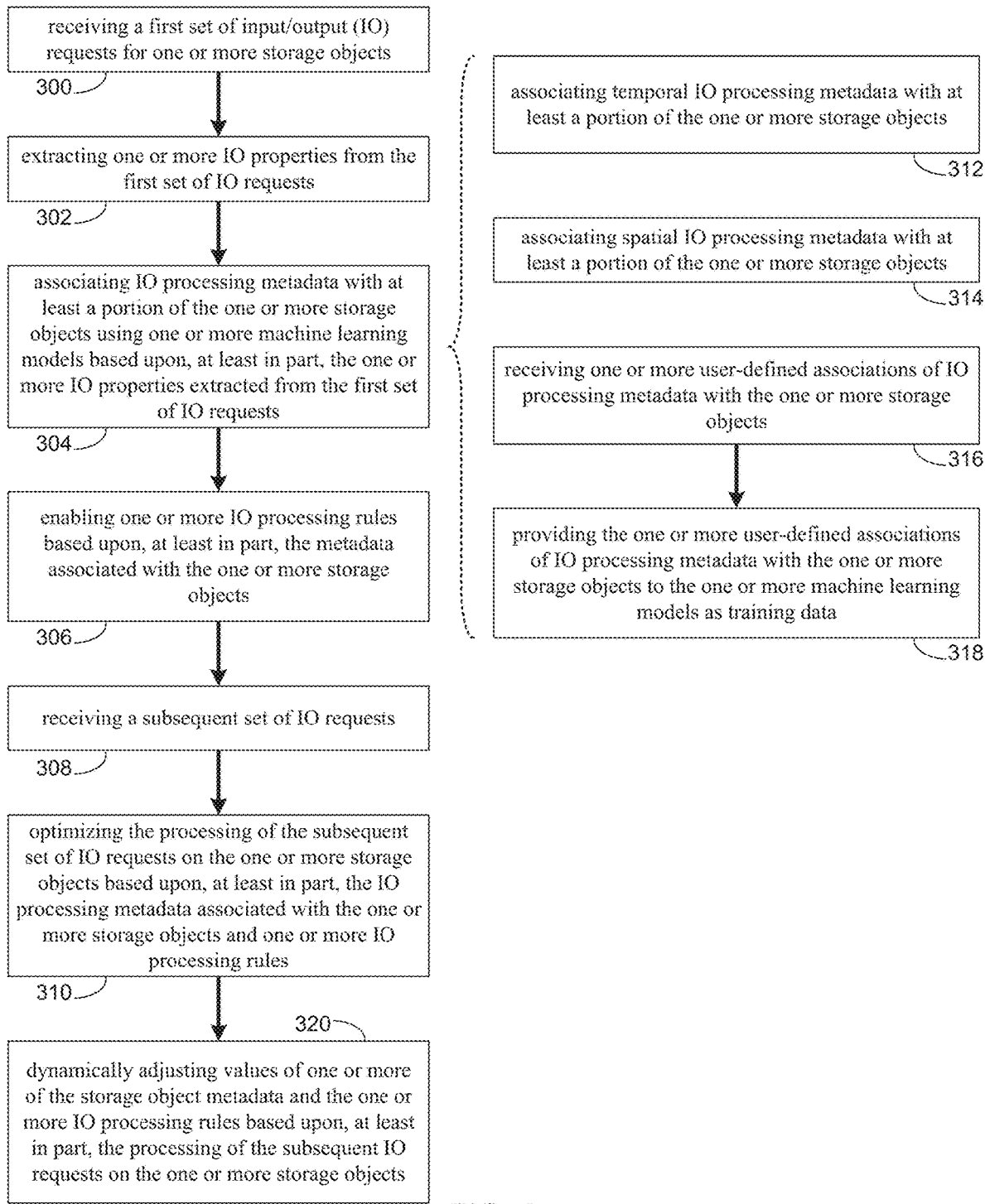
FIG. 3 is an example flowchart of storage optimization process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniB and network, or any other circuit switched/packet switched network.

Storage system 12 may execute all or a portion of storage optimization process 10. The instruction sets and subroutines of storage optimization process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of storage optimization process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of storage optimization process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage optimization process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Storage Optimization Process:

Referring also to the examples of FIGS. 3-6 and in some implementations, storage optimization process 10 may receive 300 a first set of input/output (IO) requests for one or more storage objects. One or more IO properties may be extracted 302 from the first set of IO requests. Metadata may be associated 304 with the one or more storage objects using one or more machine learning models based upon, at least in part, the one or more IO properties extracted from the first set of IO requests, thus defining storage object metadata. One or more IO processing rules may be enabled 306 based upon, at least in part, the storage object metadata. A subsequent set of IO requests may be received 308. Processing of the subsequent set of IO requests on the one or more storage objects may be optimized 310 based upon, at least in part, the storage object metadata and the one or more IO processing rules associated with the one or more storage objects.

As will be discussed in greater detail below, implementations of the present disclosure may allow for the automatic tagging of storage objections with application and workload metadata, and use of this metadata to optimize and automate the storage array using machine learning. For example, storage arrays may be unaware of the applications and workloads that initiate IO requests to volumes or other storage objects stored on the storage array. As a result the ability of the storage array to make important performance decisions and tune relevant parameters is highly restricted. Negative implications can include erroneous data placement, inefficient utilization of system resources, performance problems such as write amplification due to unnecessary data movement across tiers, unnecessary overhead such as compression or deduplication of hot data, missed opportunities for optimization such as prefetching sequentially accessed data to reduce read data latency, and many others.

Determining the application and workload type for storage objects is challenging for multiple reasons. For example, customers may utilize underlying storage in many different and unforeseen ways. The host operating system generally hides vital storage metadata through layers of abstraction, such as a volume manager and a file system. In a block storage device, discrete block IO requests may arrive from multiple hosts and applications, in any order, and the associated IO streams may exhibit very different characteristics. The host and device drivers may communicate with the storage system using protocols such as SCSI and NVMe, giving very little information which can be used to determine the type of application using the storage system. Accordingly, conventional processes for determining the application and/or workload type for a particular volume or other storage object may be ineffective.

As will be discussed in greater detail below, implementations of the present disclosure may provide a framework for collecting and analyzing IO requests and tagging metadata related to storage objects, such as volumes and files. In some implementations, this metadata can be used by the storage system (e.g. in the data path) to achieve significant data reduction and performance gains. For example, the present disclosure may incorporate machine learning to enable storage optimization automatically without the need for customer or other human consultation or involvement. In this manner, the present disclosure may be independent of any controller or device hardware or configuration.

Figure 4:
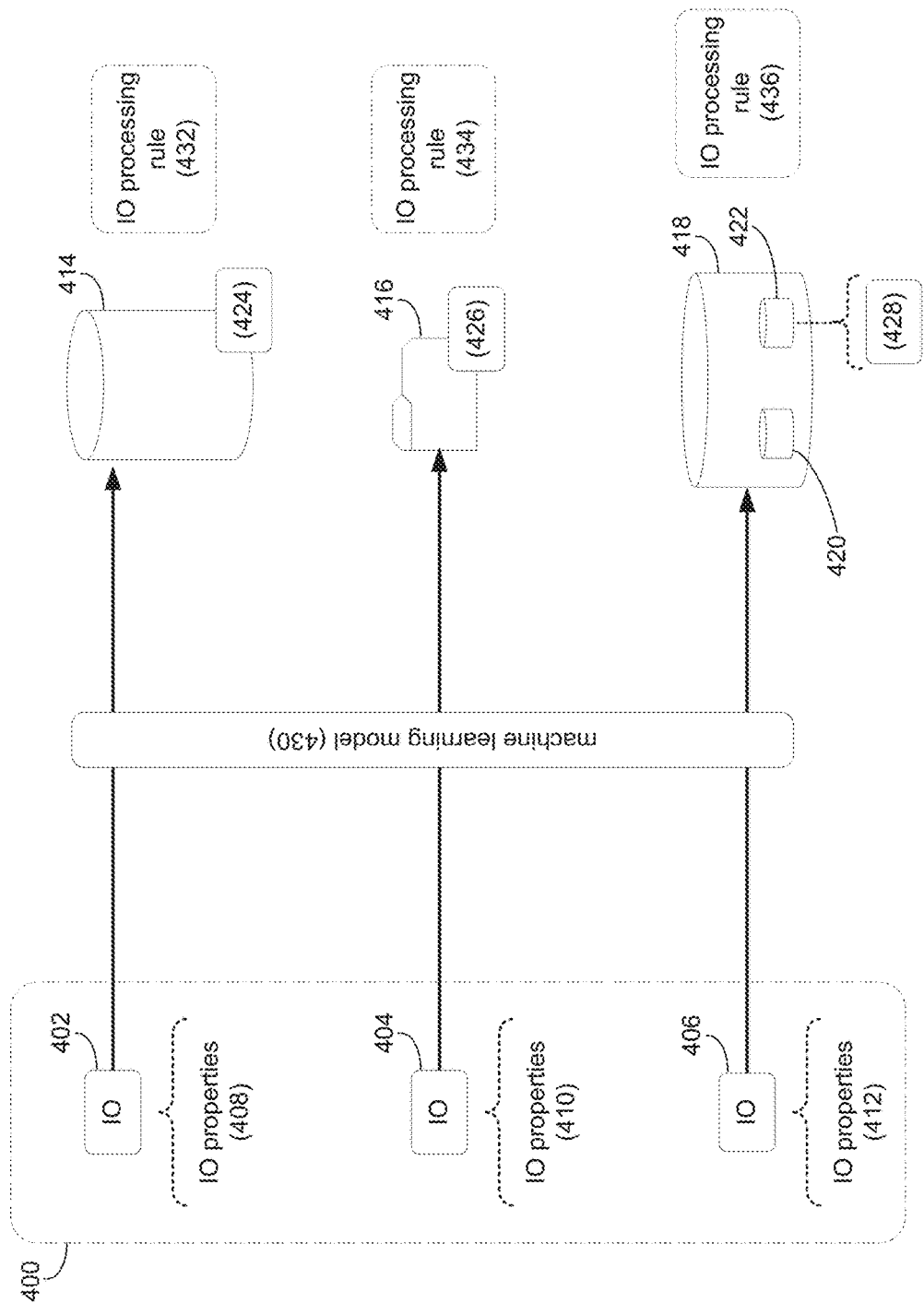
FIGS. 4-6 are example diagrammatic views of the storage system of FIG. 1 according to one or more example implementations of the disclosure.

In some implementations, storage optimization process 10 may receive 300 a first set of input/output (IO) requests for one or more storage objects. Referring also to FIG. 4 and in some implementations, storage optimization process 10 may receive 300 a first set of IO requests (e.g., first set of IO requests 400). In some implementations, first set of IO requests 400 may include one or more IO requests (e.g., IO requests 402, 404, 406). While an example of e.g., three IO requests is shown for first set of IO requests 400 in FIG. 4, it will be appreciated that any number of IO requests may be included within the first set of IO requests, within the scope of the present disclosure. As will be discussed in greater detail below, the first set of IO requests may be utilized, at least in part, to train a machine learning model to process IO properties from the first set of IO requests for associating metadata with one or more storage objects within a storage system.

In some implementations, storage optimization process 10 may extract 302 one or more IO properties from the first set of IO requests. For example, storage optimization process 10 may utilize known network traffic interception tools to capture an IO stream (e.g., first set of IO requests 400) from a host to the storage array in an industry standard file. In one example, storage optimization process 10 may extract 302 one or more IO properties from first set of IO requests 400 as a e.g., .pcap (packet capture) file. However, it will be appreciated that storage optimization process 10 may extract 302 the one or more IO properties from the first set of IO requests with various types of files within the scope of the present disclosure.

In some implementations, storage optimization process 10 may extract 302 salient data elements (e.g., one or more IO properties) such as the operation type, location in the volume or file, transfer length, timestamp, etc. that may be used as basic features in the training of and/or implementation of a machine learning model. In some implementations, extracting 302 one or more IO properties from the first set of IO requests may include capturing various statistics associated with the first set of IO requests. For example, such statistics may include, but is not limited to: a volume ID, timestamp, IO command type (e.g. read, write, unmap, etc.), LBA (i.e., an offset in the data path's thin address space), length, pattern (e.g., sequential, random, caterpillar, IO-stride), etc. In this manner, storage optimization process 10 may extract various IO properties associated with the first set of IO requests.

Referring again to FIG. 4 and in some implementations, storage optimization process 10 may extract 302 one or more IO properties from first set of IO requests 400. For example, storage optimization process 10 may extract 302 IO properties 408 from IO request 402; IO properties 410 from IO request 404; and IO properties 412 from IO request 406.

In some implementations, storage optimization process 10 may associate 304 metadata with the one or more storage objects using one or more machine learning models based upon, at least in part, the one or more IO properties extracted from the first set of IO requests. Storage object metadata may generally include metadata indicative of the application(s) and/or workflow(s) associated with a storage object, how the data related to the storage object is stored (statically) and how it may be accessed (dynamically). For example, storage object metadata may generally include, but is not limited to, a storage object name; operating system (including a virtual machine); a particular file system (e.g. EXT*, XFS, JFS, NTFS, VMFS . . . ); a file type; an application category (e.g. database); a particular application (e.g. Oracle); a particular workload (e.g. OLTP, TPC-C); a purpose or role for the storage object (e.g. data, log, etc.); an access pattern (e.g., random, sequential, etc.); whether or not the storage object is encrypted; whether or not the storage object is compressed; an access "temperature" or measurement of access frequency; and statistical properties (e.g., such as the average IO request size or a read/write IO request ratio (e.g., for some reference period, e.g. during the last hour)). In one example, storage object metadata may describe the types of applications that store application data within a particular storage object. In another example, storage object metadata may indicate how data is processed for storage in a particular storage object (e.g., a data compression level, deduplication, etc.). In another example, storage object metadata may describe how often a storage object is accessed and/or an access pattern for the storage object. Accordingly, it will be appreciated that various characteristics of the storage object and how the storage object is utilized by a storage system, may be described by storage object within the scope of the present disclosure.

A storage object may generally refer to any container or storage unit configured to store data within a storage system. For example, a storage objects may be any one of the following: a volume (aka Logical Unit Number (LUN)), a file, or parts thereof that may be defined e.g. by offsets or address ranges (e.g., sub-LUNs, disk extents, and/or slices). Referring again to FIG. 4 and in some implementations, examples of storage objects may include one or more volumes or sub-volumes (e.g., volume 414), one or more files (e.g., file 416), one or more disks (e.g., disk 418), and one or more disk extents within a disk (e.g., disk extents 420, 422). While four examples of storage objects have been described, it will be appreciated that any number of and/or type of storage object may be used within the scope of the present disclosure.

In some implementations, associating 304 the storage object metadata with the one or more storage objects may include one or more of: associating 312 temporal storage object metadata with the one or more storage objects; and associating 314 spatial IO processing metadata with the one or more storage objects. In some implementations, temporal IO processing metadata may generally indicate a period of time or periods of time for which particular IO processing metadata is relevant for a particular storage object. For example and in some implementations, suppose the IO properties associated with and extracted from an IO request (e.g., IO properties 408) associated with and extracted from IO request 402) indicate that a volume (e.g., volume 414) is storing data that has e.g., two access periods: a time period of e.g., hourly data access (on average) and a time period of e.g., monthly data access (on average). In this example, storage optimization process 10 may associate 312 this temporal storage object (e.g., temporal storage object metadata 424) with volume 414. As will be discussed in greater detail below and based on the access periods, storage optimization process 10 may process IO requests for volume 414 differently than for other storage objects.

In another example, suppose that the IO properties associated with and extracted from an IO request (e.g., IO properties 410 associated with and extracted from IO request 404) indicate that a file (e.g., file 416) is storing data that is accessed very infrequently (e.g., based on a predefined access threshold). In this example, storage optimization process 10 may associate 312 temporal storage object metadata (e.g., temporal storage object metadata 426) with file 416 indicating that file 416 is accessed very infrequently. As will be discussed in greater detail below, by utilizing temporal storage object metadata 426 when processing IO requests for file 416, storage optimization process 10 may determine how to process the IO requests in light of the infrequent access of file 416 (e.g., by compressing the data of an IO write request). In this manner, storage optimization process 10 may associate 312 temporal storage object metadata to help a storage system to more efficiently utilize storage resources when processing IO requests for particular storage objects.

In some implementations, spatial storage object metadata may generally describe storage object metadata for particular portions of a storage object. For example, spatial storage object metadata may indicate how a storage object is apportioned into multiple sub-portions such that different portions of a data object may be utilized for different applications and/or for distinct workflows. For example and in some implementations, suppose the IO properties associated with and extracted from an IO request (e.g., IO properties 410 associated with and extracted from IO request 406) indicate that a disk (e.g., disk 418) is storing data in multiple disk extents (e.g., disk extents 420, 422). In this example, storage optimization process 10 may determine that IO properties 412 pertain to disk extent 422 but not to disk extent 420. In this manner, storage optimization process 10 may associate 314 this spatial storage object metadata (e.g., spatial storage object metadata 428) with disk extent 422. As will be discussed in greater detail below and based on the particular disk extent, storage optimization process 10 may process IO requests for disk 418 differently for disk extent 420 than for disk extent 422.

In some implementations, storage optimization process 10 may associate 304 storage object metadata with the one or more storage objects using one or more machine learning models based upon, at least in part, the one or more IO properties extracted from the first set of IO requests. As is known in the art, a machine learning model may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. As is known in the art, supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). As is known in the art, reinforcement learning may generally include a computing device interacting in a dynamic environment in which it must perform a certain goal (such as driving a vehicle or playing a game against an opponent). As it navigates its problem space, the machine learning model is provided feedback that's analogous to rewards, which it tries to maximize. While three examples of machine learning approaches have been provided, it will be appreciated that other machine learning approaches are possible within the scope of the present disclosure.

In some implementations, one or more machine learning models may be used for classification and/or regression. For example, classification models may be used to detect application, workload type, or access pattern; while regression models may be used to tune parameters, such as compression level, to an optimal value. Ensemble methods such as Random Forrest (a collection of decision trees) may be candidates for these machine learning models because of their simplicity, speed, and lower risk of overfitting. However, it will be appreciated that the one or more machine learning models may utilize various types of machine learning algorithms for associating 304 the storage object metadata with the one or more storage objects within the scope of the present disclosure.

In some implementations, the one or more machine learning models may be configured for one or more of: offline training and continuous training. Offline training may generally include a one-time or single training of the one or more machine learning models with training data that is performed separately from the processing of non-training data. Continuous training may generally include changing or updating the one or more machine learning models data comes in, e.g. with every "n"th IO request. Storage optimization process 10 may also guide the training process to acquire more useful data using active learning. For example, storage optimization process 10 can sample with higher frequency the storage objects in which the quality of the current model (measured by MSE, RMSE or similar metrics) is low.

In some implementations, storage optimization process 10 may utilize various approaches to associate 304 the storage object metadata with the one or more storage objects based upon, at least in part, the one or more IO properties extracted from the first set of IO requests. For example, storage optimization process 10 may utilize a dynamic approach where one or more machine learning models are trained and configured to analyze the sequence of input/outputs operations per second (IOPs) using classification or regression machine learning models. In another example, storage optimization process 10 may utilize a static approach where one or more machine learning models are trained and configured to analyze the block structure, in particular the first blocks written by an application, and look for definitive or high probability "signatures".

In another example, storage optimization process 10 may utilize an empirical or statistical approach where the processing of IO requests on the one or more storage objects is monitored and feedback is provided to determine which operations performed when processing the IO requests were effective given the storage object and the applications associated with the storage object. For example, IO processing rules may be defined to determine when the data of an IO request is not amenable to compression or deduplication, or the resulting data reduction is not worth the effort invested. In this manner, it will be appreciated that associating 304 the storage object metadata with the one or more storage objects may influence how subsequent IO requests for the one or more storage objects are processed.

Referring again to FIG. 4 and in some implementations, storage optimization process 10 may associate 304 storage object metadata with the one or more storage objects using one or more machine learning models based upon, at least in part, the one or more IO properties extracted from the first set of IO requests. For example, storage optimization process 10 may associate 304 storage object metadata 424 with volume 414 using one or more machine learning models (e.g., machine learning model 430) based upon, at least in part, IO properties 408 extracted from IO request 402. Similarly, storage optimization process 10 may associate 304 storage object metadata 426 with file 416 using machine learning model 430 based upon, at least in part, IO properties 410 extracted from IO request 404. Additionally, storage optimization process 10 may associate 304 storage object metadata 428 with disk extent 422 using machine learning model 430 based upon, at least in part, IO properties 412 extracted from IO request 406.

In some implementations, associating 304 the storage object metadata with the one or more storage objects may include receiving 316 one or more user-defined associations of storage object metadata with the one or more storage objects. In some implementations, storage optimization process 10 may provide a user with the ability to define the storage object metadata for a particular storage object. For example, when a storage object is created (e.g., by a user or automatically), storage optimization process 10 may request that a user define the types of applications and/or workflows for the storage object. In some implementations, storage optimization process 10 may provide a graphical user interface to allow a user to define the storage object metadata for a particular storage object.

Figure 5:
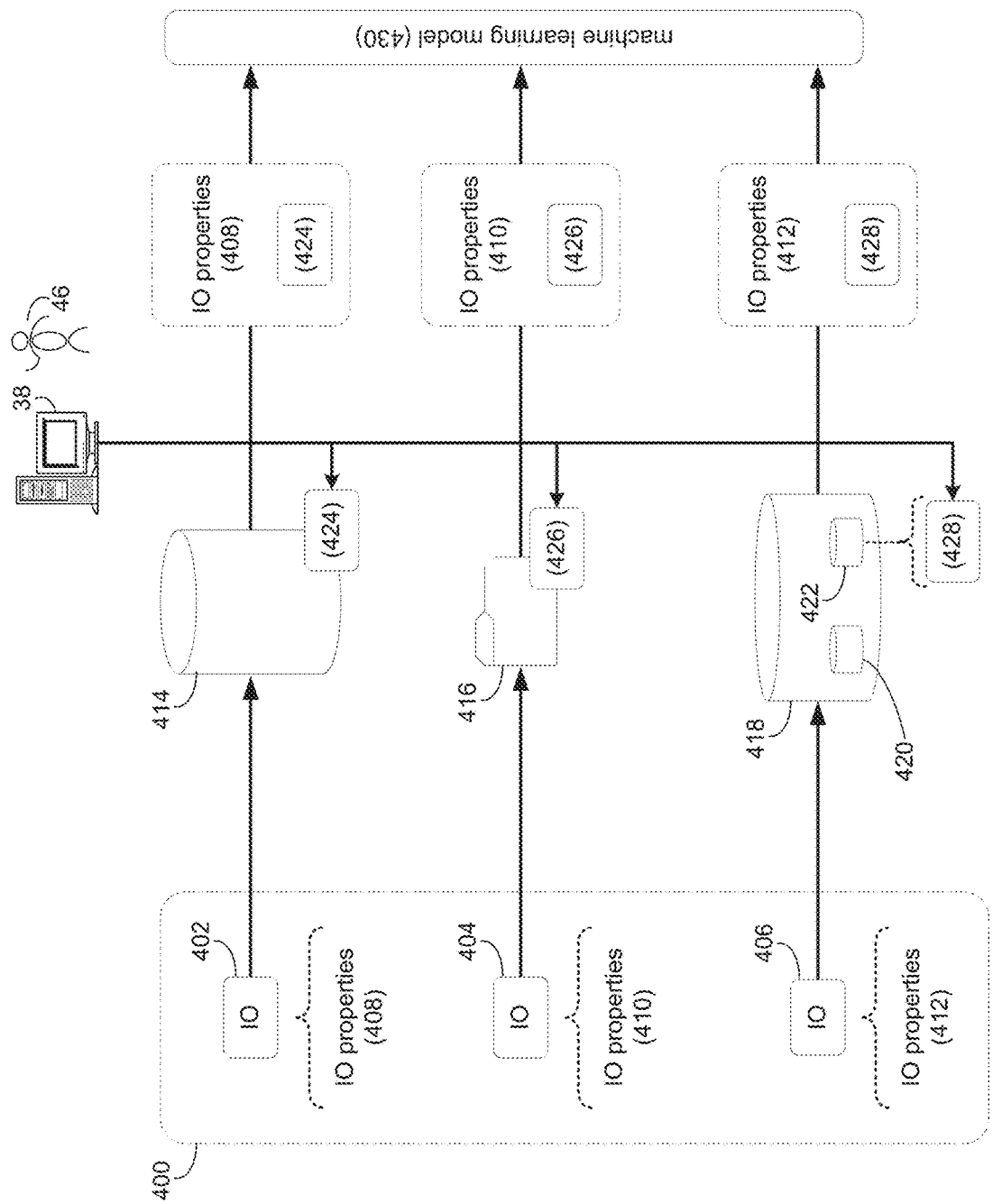

Referring also to FIG. 5 and in some implementations, storage optimization process 10 may receive 316 one or more user-defined associations of storage object metadata (e.g., storage object metadata 424, 426, 428) with the one or more storage objects (e.g., storage objects 414, 416, 422). In this example, suppose user 46, using computing device 38, provides (e.g., via a user interface) storage object metadata 424, 426, and 428 for storage objects 414, 416, and 418. In this example, storage optimization process 10 may utilize the user-defined associations of storage object metadata 424 with volume 414; storage object metadata 426 with file 416; and storage object metadata 428 with disk extent 422 to train machine learning model 430 to automatically associate 304 storage object metadata with the one or more storage objects. In this manner and as will be discussed in greater detail below, the user-defined associations of storage object metadata with storage objects may provide supervised learning for machine learning model 430.

In some implementations, associating 304 the storage object metadata with the one or more storage objects may include providing 318 the one or more user-defined associations of storage object metadata with the one or more storage objects to the one or more machine learning models as training data. Referring again to FIG. 5 and in some implementations, data collected from first set of IO requests 400 may be divided into training and test data. In some implementations, the training information may be provided to train machine learning model 430. Machine learning model 430 may be refined by training with additional application and workload datasets (e.g., new labels), by adding more attributes (e.g. feature engineering), by adding more training data, and/or by tuning the machine learning algorithm(s). In some implementations, the training process of the one or more machine learning models may be scaled by running the training process in parallel on multiple CPU cores and/or may be distributed to multiple computing devices. Additionally, deep learning models may be utilized, with the optional use of graphical processing units (GPUs) to accelerate the training process.

In some implementations, storage optimization process 10 may enable 306 one or more IO processing rules based upon, at least in part, the storage object metadata objects. Enabling 306 one or more IO processing rules may generally include associating particular IO processing rules with the processing of IO requests on specific storage objects. An IO processing rule may generally refer to a rule or portion of logic that determines how an IO request is processed on a particular storage object. In some implementations, storage optimization process 10 may define the one or more IO processing rules for optimizing the processing of IO requests on the one or more storage objects based upon, at least in part, the storage object metadata associated with the one or more storage objects.

For example, storage optimization process 10 may define one or more IO processing rules based on the storage object metadata associated with the one or more storage objects. The one or more IO processing rules may be defined to optimize access to the one or more storage objects. The optimization provided by the combination of the storage object metadata and the one or more IO processing rules may help reduce the access time, storage space required, etc. during the processing of IO requests on the one or more storage objects. Storage optimization process 10 may define the one or more IO processing rules based upon, at least in part, monitoring the one or more storage objects before, during, and after the processing of the first set of IO requests and the subsequent set of IO requests. In some implementations, the IO processing rules may be received from and/or stored in a data structure accessible to storage optimization process 10.

In one example, suppose storage optimization process 10 associates 304 metadata 424 with volume 414 indicating that, in this example, volume 414 is an encrypted volume. Further suppose that an IO processing rule (e.g., IO processing rule 432) indicates that e.g., deduplication operations are ineffective against encrypted volumes. In this example, storage optimization process 10 may enable 306 IO processing rule 432 for processing of IO requests on volume 414 without performing deduplication operations based upon, at least in part, metadata 424 associated with volume 414 and IO processing rule 432.

In another example, suppose storage optimization process 10 associates 304 metadata 426 with file 416 indicating that, in this example, data of file 416 is compressed. Further suppose an IO processing rule (e.g., IO processing rule 434) indicates that e.g., if a storage object is known to be compressed, no compression operations are performed on that storage object. In this example, storage optimization process 10 may enable 306 IO processing rule 434 for processing of IO requests on file 416 without performing compression operations based upon, at least in part, metadata 426 associated with file 416 and IO processing rule 434.

In another example, suppose storage optimization process 10 associates 304 metadata 428 with disk extent 422 indicating that, in this example, disk extent 422 is storing incremental backup data of a backup application. Further suppose an IO processing rule (e.g., IO processing rule 436) indicates that e.g., data associated with a full backup may subject to one level of optimization and that data associated with an incremental backup may be subject to another level of optimization. In this example, storage optimization process 10 may enable 306 IO processing rule 436 for processing of IO requests on disk extent 422 by performing one or more storage optimizations associated with an incremental backup based upon, at least in part, metadata 428 associated with disk extent 422 and IO processing rule 436.

Figure 6:
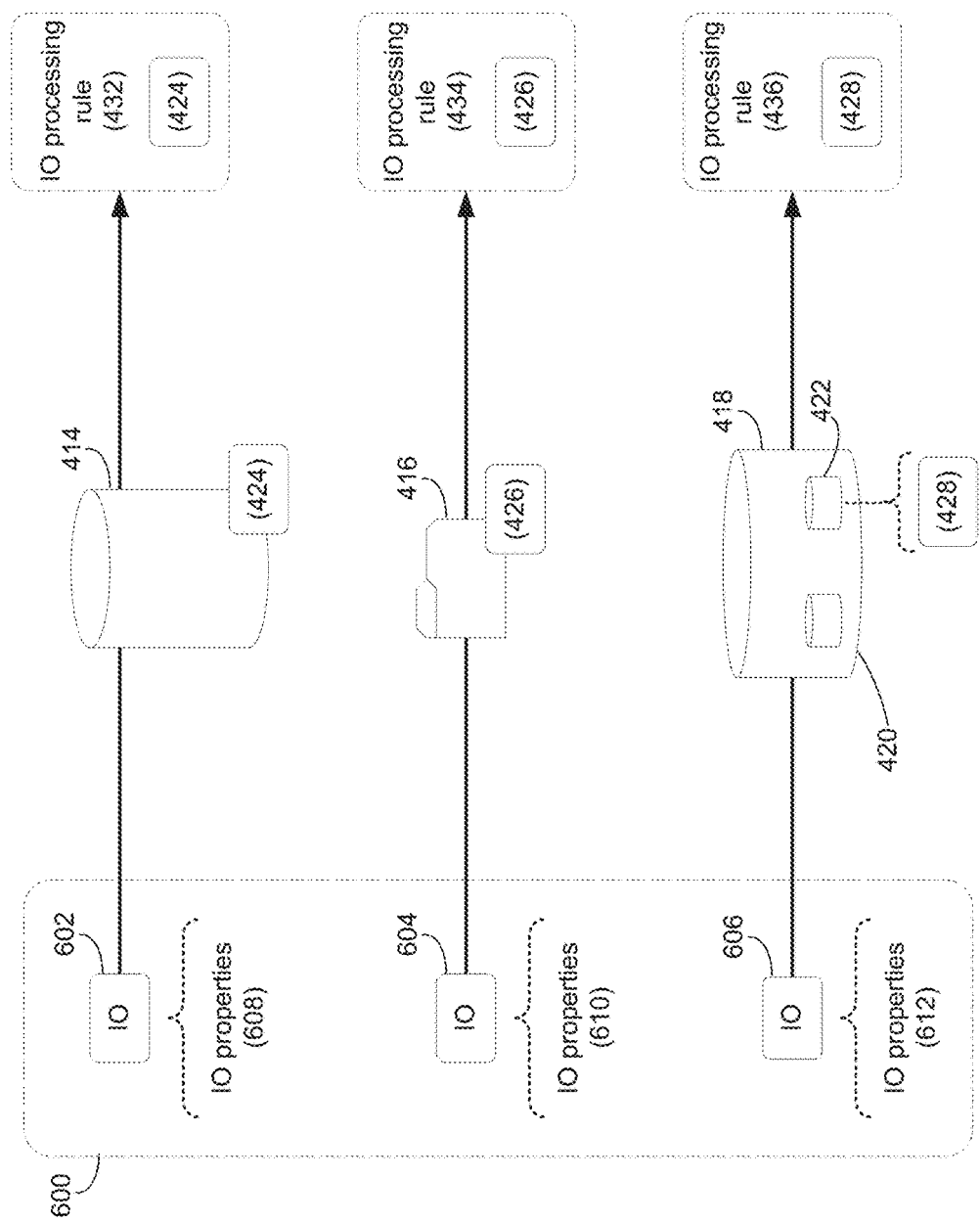

In some implementations, storage optimization process 10 may receive 308 a subsequent set of IO requests. Referring also to FIG. 6 and in some implementations, suppose that machine learning model 430 is trained as described above. In this example, further suppose that storage optimization process 10 receives 308 a subsequent set of IO requests (e.g., subsequent set of IO requests 600) for processing on the one or more storage objects. Further suppose that subsequent set of IO requests 600 includes e.g., three IO requests (e.g., IO requests 602, 604, 606) configured to perform various operations on one or more storage objects. In this example, suppose that IO request 602 is configured to perform an IO operation on volume 414; IO request 604 is configured to perform an IO operation on file 416; and that IO request 606 is configured to perform an IO operation on disk extent 422. While subsequent set of IO requests 600 is shown with e.g., three IO requests, it will be appreciated that subsequent set of IO requests 600 may include any number of IO requests for any number of storage objects within the scope of the present disclosure. In some implementations and in response to receiving subsequent set of IO requests 600, storage optimization process 10 may identify storage object metadata associated with the storage objects "targeted" by the subsequent set of IO requests. For example, storage optimization process 10 may identify storage object metadata 424 associated with volume 414; storage object metadata 426 associated with file 416; and storage object metadata 428 associated with disk extent 422.

In some implementations, storage optimization process 10 may optimize 310 the processing of the subsequent set of IO requests on the one or more storage objects based upon, at least in part, the storage object metadata associated with the one or more storage objects and one or more IO processing rules. For example, storage optimization process 10 may utilize one or more IO processing rules to determine how to process the subsequent set of IO requests on the one or more storage objects based upon, at least in part, the storage object metadata associated with the one or more storage objects.

For example and as shown in FIG. 6, storage optimization process 10 may use storage object metadata 424 and IO processing rule 432 to determine how to process IO 602 on volume 414; storage object metadata 426 to determine how to process IO 604 on file 416 and IO processing rule 434; and storage object metadata 428 to determine how to process IO 606 on disk extent 422 and IO processing rule 436.

In one example, suppose storage optimization process 10 associates 304 metadata 424 with volume 414 indicating that, in this example, volume 414 is an encrypted volume. Further suppose that storage optimization process 10 includes IO processing rules (e.g., IO processing rule 432) indicating that e.g., deduplication operations are ineffective against encrypted volumes. In this example, storage optimization process 10 may optimize 310 the processing of IO request 602 on volume 414 without performing deduplication operations based upon, at least in part, metadata 424 associated with volume 414 and IO processing rule 432.

In another example, suppose storage optimization process 10 associates 304 metadata 426 with file 416 indicating that, in this example, data of file 416 is only stored for a short time (e.g., short-lived data). Further suppose that storage optimization process 10 includes IO processing rules (e.g., IO processing rule 434) indicating that e.g., compression and deduplication operations are performed on data with a predicted storage time above a particular predefined threshold. In this example, storage optimization process 10 may optimize 310 the processing of IO request 604 on file 416 without performing compression or deduplication operations based upon, at least in part, metadata 426 associated with file 416 and IO processing rule 434.

In another example, suppose storage optimization process 10 associates 304 metadata 428 with disk extent 422 indicating that, in this example, disk extent 422 is storing incremental backup data of a backup application. Further suppose that storage optimization process 10 includes IO processing rules (e.g., IO processing rule 436) indicating that e.g., data associated with a full backup may subject to one level of optimization and that data associated with an incremental backup may be subject to another level of optimization. In this example, storage optimization process 10 may optimize 310 the processing of IO request 606 on disk extent 422 by performing one or more storage optimizations associated with an incremental backup based upon, at least in part, metadata 428 associated with disk extent 422 and IO processing rule 436. While three examples of how the processing of a subsequent set of IO requests may be optimized 310 based upon, at least in part, the storage object metadata associated with the one or more storage objects and the one or more IO processing rules, it will be appreciated that storage optimization process 10 may optimize 310 the processing of the subsequent set of IO requests in many ways according to various IO processing rules, within the scope of the present disclosure.

Storage optimization process 10 may dynamically adjust 320 one or more of the storage object metadata associated with the one or more storage objects and the one or more IO processing rules based upon, at least in part, the processing of the subsequent IO requests on the one or more storage objects. In addition to training the one or more machine learning models using the first set of IO requests, storage optimization process 10 may update the storage object metadata associated with the one or more storage objects by analyzing/learning from the processing of subsequent IO requests. Further, storage optimization process 10 may redefine or update IO processing rules for new IO requests based on new learnings and new storage object metadata. Accordingly, storage optimization process 10 may continuously adapt to changes in the IO properties of IO requests, storage object metadata, and/or IO processing rules throughout the lifetime of storage object.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   receiving a first set of input/output (IO) requests for one or more storage objects stored on a storage array;
   extracting one or more IO properties from the first set of IO requests;

associating metadata with the one or more storage objects using one or more machine learning models based upon, at least in part, the one or more IO properties extracted from the first set of IO requests, thus defining storage object metadata, wherein associating the storage object metadata with the one or more storage objects includes associating temporal storage object metadata with the one or more storage objects, wherein the temporal storage object metadata indicates a period of time for which a particular temporal storage object metadata is relevant for a particular storage object, and wherein associating the storage object metadata with the one or more storage objects includes associating spatial IO processing metadata with the one or more storage objects, wherein the spatial IO processing metadata indicates how the particular storage object is being apportioned into multiple sub-portions for utilizing the multiple sub-portions in different applications and for distinct workflows;

enabling one or more IO processing rules based upon, at least in part, the storage object metadata;

receiving a subsequent set of IO requests, wherein in response to receiving the subsequent set of IO requests, identifying the storage object metadata associated with the one or more storage objects targeted by the subsequent set of IO requests;

defining the one or more IO processing rules for optimizing processing of the subsequent set of IO requests on the one or more storage objects based upon, at least in part, the storage object metadata associated with the one or more storage objects and monitoring the one or more storage objects before, during, and after the processing of the first set of IO requests and the subsequent set of IO requests;

enabling storage optimization of the processing of the subsequent set of IO requests on the one or more storage objects based upon, at least in part, the storage object metadata and the one or more IO processing rules associated with the one or more storage objects;

dynamically adjusting values of one or more of the storage object metadata and the one or more IO processing rules based upon, at least in part, the processing of the subsequent IO requests on the one or more storage objects; and updating IO processing rules for new IO requests based on new learnings and new storage object metadata to optimize and automate the storage array.

2. The computer-implemented method of claim 1, wherein the one or more storage objects include at least one of:
one or more volumes;
one or more files; and
one or more Logical Unit Numbers (LUNs).

3. The computer-implemented method of claim 1, wherein associating the storage object metadata with the one or more storage objects includes:
associating spatial storage object metadata with the one or more storage objects.

4. The computer-implemented method of claim 1, wherein associating the storage object metadata with the one or more storage objects includes:
receiving one or more user-defined associations of storage object metadata with the one or more storage objects.

5. The computer-implemented method of claim 4, wherein associating the storage object metadata with the one or more storage objects includes:

providing the one or more user-defined associations of storage object metadata with the one or more storage objects to the one or more machine learning models as training data.

6. The computer-implemented method of claim 1, wherein the one or more machine learning models are configured for one or more of: offline training and continuous training.

7. A computer program product residing on a non-transitory computer readable medium having a plurality of instructions stored thereon which, when executed by a processor, cause the processor to perform operations comprising:
receiving a first set of input/output (IO) requests for one or more storage objects stored on a storage array;
extracting one or more IO properties from the first set of IO requests;
associating metadata with the one or more storage objects using one or more machine learning models based upon, at least in part, the one or more IO properties extracted from the first set of IO requests, thus defining storage object metadata,
wherein associating the storage object metadata with the one or more storage objects includes associating temporal storage object metadata with the one or more storage objects, wherein the temporal storage object metadata indicates a period of time for which a particular temporal storage object metadata is relevant for a particular storage object, and
wherein associating the storage object metadata with the one or more storage objects includes associating spatial IO processing metadata with the one or more storage objects, wherein the spatial IO processing metadata indicates how the particular storage object is being apportioned into multiple sub-portions for utilizing the multiple sub-portions in different applications and for distinct workflows;
enabling one or more IO processing rules based upon, at least in part, the storage object metadata;
receiving a subsequent set of IO requests, wherein in response to receiving the subsequent set of IO requests, identifying the storage object metadata associated with the one or more storage objects targeted by the subsequent set of IO requests;
defining the one or more IO processing rules for optimizing processing of the subsequent set of IO requests on the one or more storage objects based upon, at least in part, the storage object metadata associated with the one or more storage objects and monitoring the one or more storage objects before, during, and after the processing of the first set of IO requests and the subsequent set of IO requests;
enabling storage optimization of the processing of the subsequent set of IO requests on the one or more storage objects based upon, at least in part, the storage object metadata and the one or more IO processing rules associated with the one or more storage objects;
dynamically adjusting values of one or more of the storage object metadata and the one or more IO processing rules based upon, at least in part, the processing of the subsequent IO requests on the one or more storage objects; and
updating IO processing rules for new IO requests based on new learnings and new storage object metadata.

8. The computer program product of claim 7, wherein the one or more storage objects include at least one of:
one or more volumes;
one or more files; and
one or more Logical Unit Numbers (LUNs).

9. The computer program product of claim 7, wherein associating the storage object metadata with the one or more storage objects includes:
associating spatial storage object metadata with the one or more storage objects.

10. The computer program product of claim 7, wherein associating the storage object metadata with the one or more storage objects includes:
receiving one or more user-defined associations of storage object metadata with the one or more storage objects.

11. The computer program product of claim 10, wherein associating the storage object metadata with the one or more storage objects includes:
providing the one or more user-defined associations of storage object metadata with the one or more storage objects to the one or more machine learning models as training data.

12. The computer program product of claim 7, wherein the one or more machine learning models are configured for one or more of: offline training and continuous training.

13. A computing system comprising:
a memory; and
a processor configured to receive a first set of input/output (IO) requests for one or more storage objects stored on a storage array, wherein the processor is further configured to extract one or more IO properties from the first set of IO requests, wherein the processor is further configured to associate metadata with the one or more storage objects using one or more machine learning models based upon, at least in part, the one or more IO properties extracted from the first set of IO requests, thus defining storage object metadata, wherein associating the storage object metadata with the one or more storage objects includes associating temporal storage object metadata with the one or more storage objects, wherein the temporal storage object metadata indicates a period of time for which a particular temporal storage object metadata is relevant for a particular storage object, wherein associating the storage object metadata with the one or more storage objects includes associating spatial IO processing metadata with the one or more storage objects, wherein the spatial IO processing metadata indicates how the particular storage object is being apportioned into multiple sub-portions for utilizing the multiple sub-portions in different applications and for distinct workflows, wherein the processor is further configured to enable one or more IO processing rules based upon, at least in part, the storage object metadata objects, wherein the processor is further configured to receive a subsequent set of IO requests, wherein in response to receiving the subsequent set of IO requests, the processor is further configured to identify the storage object metadata associated with the one or more storage objects targeted by the subsequent set of IO requests, wherein the processor is further configured to define the one or more IO processing rules for optimizing processing of the subsequent set of IO requests on the one or more storage objects based upon, at least in part, the storage object metadata associated with the one or more storage objects and monitoring the one or more storage objects before, during, and after the processing of the first set of IO requests and the subsequent set of IO requests, wherein the processor is further configured to enable storage optimization of the processing of the subsequent set of IO requests on the one or more storage objects based upon, at least in part, the storage object metadata and the one or more IO processing rules associated with the one or more storage objects, wherein the processor is further configured to dynamically adjust values of one or more of the storage object metadata and the one or more IO processing rules based upon, at least in part, the processing of the subsequent IO requests on the one or more storage objects, and wherein the processor is further configured to update IO processing rules for new IO requests based on new learnings and new storage object metadata.

14. The computing system of claim 13, wherein the one or more storage objects include at least one of:
one or more volumes;
one or more files; and
one or more Logical Unit Numbers (LUNs).

15. The computing system of claim 13, wherein associating the storage object metadata with the one or more storage objects includes:
associating spatial storage object metadata with the one or more storage objects.

16. The computing system of claim 13, wherein associating the storage object metadata with the one or more storage objects includes:
receiving one or more user-defined associations of storage object metadata with the one or more storage objects.

17. The computing system of claim 16, wherein associating the storage object metadata with the one or more storage objects includes:
providing the one or more user-defined associations of storage object metadata with the one or more storage objects to the one or more machine learning models as training data.

* * * * *